United States Patent
Li et al.

(10) Patent No.: US 12,117,644 B1
(45) Date of Patent: Oct. 15, 2024

(54) LIGHT SOURCE MODULE THAT CAN REDUCE THE VOLUME OF AN OPTICAL SYSTEM AND LIGHT LOSS

(71) Applicant: Himax Display, Inc., Tainan (TW)

(72) Inventors: Yuet-Wing Li, Tainan (TW); Chi-Wen Lin, Tainan (TW); Kuan-Yu Chen, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 18/608,967

(22) Filed: Mar. 19, 2024

(51) Int. Cl.
*F21V 8/00* (2006.01)
*F21V 9/14* (2006.01)
*F21Y 115/10* (2016.01)

(52) U.S. Cl.
CPC ............. *G02B 6/0096* (2013.01); *F21V 9/14* (2013.01); *F21V 2200/40* (2015.01); *F21Y 2115/10* (2016.08)

(58) Field of Classification Search
CPC ..... G02B 6/0096; F21V 9/14; F21V 2200/40; F21Y 2115/10
See application file for complete search history.

(56) References Cited

U.S. PATENT DOCUMENTS

| | | | |
|---|---|---|---|
| 2010/0149800 A1* | 6/2010 | Huang | G02B 19/0028 362/235 |
| 2013/0235608 A1* | 9/2013 | Tsai | F21S 41/151 362/551 |

FOREIGN PATENT DOCUMENTS

| | | | | |
|---|---|---|---|---|
| CA | 2620144 A1 * | 10/2006 | | F21S 10/02 |
| CN | 1826544 A * | 8/2006 | | G02B 6/0096 |

* cited by examiner

*Primary Examiner* — Tracie Y Green
(74) *Attorney, Agent, or Firm* — JCIPRNET

(57) ABSTRACT

A light source module includes a light-emitting device, a light guide pipe, a wave plate, and a polarizer. The light-emitting device emits a beam. The light guide pipe includes a recessed curved surface, an output surface, a first convex surface, and a second convex surface. The recessed curved surface faces the light-emitting device. The output surface is opposite to the recessed curved surface. The first convex surface connects the recessed curved surface with the output surface. The second convex surface connects the recessed curved surface with the output surface and is opposite to the first convex surface, wherein the beam enters the light guide pipe through the recessed curved surface, and leaves the light guide pipe through the output surface. The wave plate is disposed on a path of the beam from the output surface. The polarizer is disposed on a path of the beam from the wave plate.

12 Claims, 6 Drawing Sheets

LIGHT SOURCE MODULE THAT CAN REDUCE THE VOLUME OF AN OPTICAL SYSTEM AND LIGHT LOSS

BACKGROUND

Technical Field

The invention generally relates to an optical module and, in particular, to a light source module.

Description of Related Art

With the development of displaying technology, a projector is created to form a large image with respect to the projector. A liquid-crystal-on-silicon (LCOS) panel is a key component in a projector, it can convert an illumination beam into an image beam. However, the LCOS panel is not self-luminous, so that a light source is needed to illuminate the LCOS panel.

In a conventional projector, a polarizing beam splitter (PBS) is disposed in front of the LCOS panel to filter out a beam with an unwanted polarization direction. However, the PBS occupies a large space in front of the LCOS panel, which makes the optical system too bulky. Besides, when an unpolarized illumination beam travels to the PBS, only half the illumination beam is transmitted to the LCOS panel, which causes light loss.

SUMMARY

Accordingly, the invention is directed to a light source module, which can reduce the volume of an optical system and light loss.

An embodiment of the invention provides a light source module including a light-emitting device, a light guide pipe, a wave plate, and a polarizer. The light-emitting device is configured to emit a beam. The light guide pipe includes a recessed curved surface, an output surface, a first convex surface, and a second convex surface. The recessed curved surface faces the light-emitting device. The output surface is opposite to the recessed curved surface. The first convex surface connects the recessed curved surface with the output surface. The second convex surface connects the recessed curved surface with the output surface and is opposite to the first convex surface, wherein the beam enters the light guide pipe through the recessed curved surface, and leaves the light guide pipe through the output surface. The wave plate is disposed on a path of the beam from the output surface. The polarizer is disposed on a path of the beam from the wave plate and configured to allow a first part of the beam having a first polarization direction to pass through, and reflect a second part of the beam having a second polarization direction. The second part of the beam passes through the wave plate and the output surface to enter the light guide pipe again, and at least a portion of the second part of the beam is then reflected by at least one of the recessed curved surface, the first convex surface, and the second convex surface, so as to travel back to the wave plate and the polarizer.

In the light source module according to the embodiment of the invention, a light guide pipe including a recessed curved surface, an output surface, a first convex surface, and a second convex surface is adopted, and at least a portion of the second part of the beam is reflected by at least one of the recessed curved surface, the first convex surface, and the second convex surface, so as to travel back to the wave plate and the polarizer. As a result, the light loss is reduced due to the light guide pipe recycling light, and the volume of an optical system is reduced since the light guide pipe is adopted and may have compact structure.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
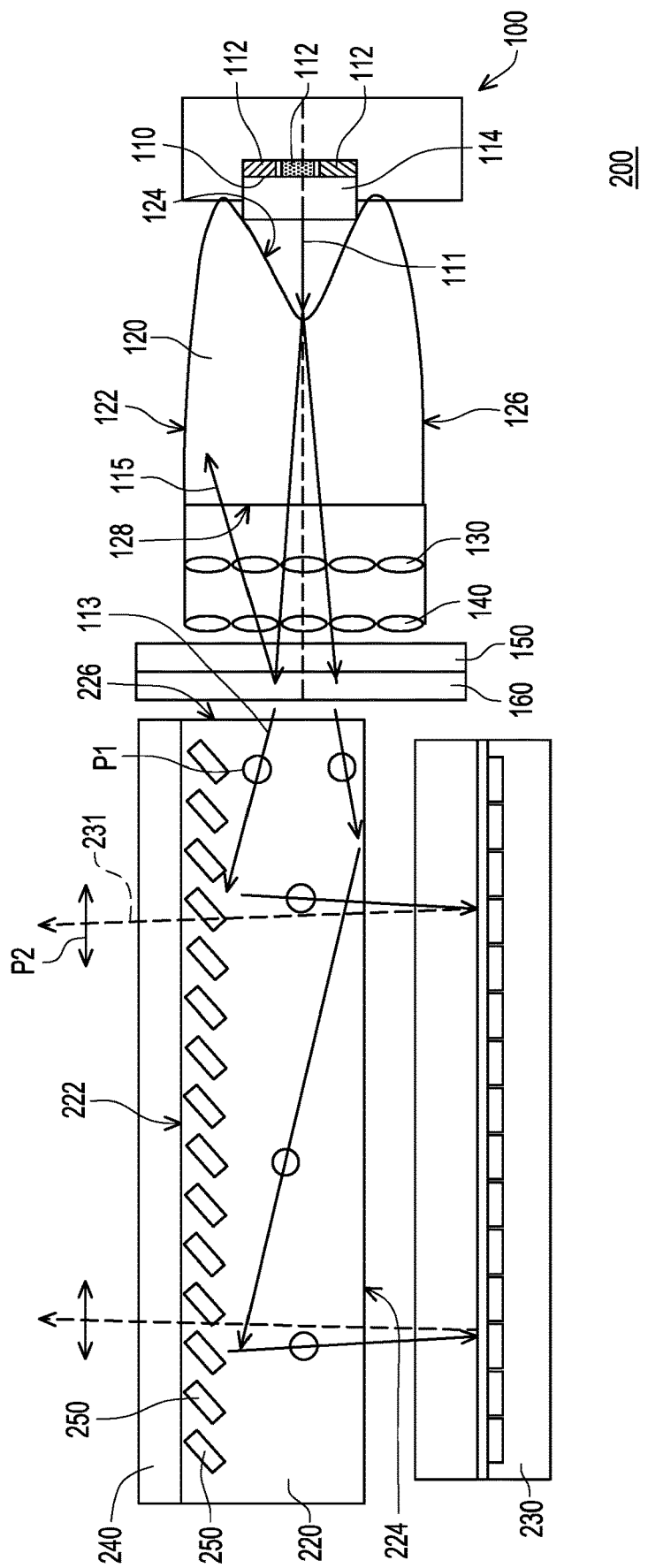
FIG. 1 is a schematic cross-section view of a front-lit LCOS module according to an embodiment of the invention.

FIG. 1 is a schematic cross-section view of a front-lit LCOS module according to an embodiment of the invention. Referring to FIG. 1, the front-lit LCOS module 200 in this embodiment includes a light source module 100, a waveguide 220, an LCOS panel 230, and a polarizer 240. The light source module 100 includes a light-emitting device 110, a light guide pipe 120, a wave plate 150, and a polarizer 160. The light-emitting device 110 is configured to emit a beam 112. In this embodiment, the light-emitting device 110 includes a plurality of light-emitting diodes (LEDs) 112 and a window plate 114 disposed on the LEDs 112. The LEDs 112 may include LEDs with a plurality light colors. For example, the LEDs 112 may include a red LED, a green LED, and a blue LED.

The light guide pipe 120 includes a recessed curved surface 124, an output surface 128, a first convex surface 122, and a second convex surface 126. The recessed curved surface 124 faces the light-emitting device 110. The output surface 128 is opposite to the recessed curved surface 124. In this embodiment, the output surface 128 is a plane surface, for example. The first convex surface 122 connects the recessed curved surface 124 with the output surface 128. The second convex surface 126 connects the recessed curved surface 124 with the output surface 128 and is opposite to the first convex surface 122, wherein the beam 111 enters the light guide pipe 120 through the recessed curved surface 124, and leaves the light guide pipe 120 through the output surface 128. In this embodiment, the beam 111 emitted from the LEDs 112 passes through the window plate 114 to arrive at the recessed curved surface 124. The wave plate 150 is disposed on a path of the beam 111 from the output surface 128. The polarizer 160 is disposed on a path of the beam 111 from the wave plate 150 and configured to allow a first part 113 of the beam 111 having a first polarization direction P1 to pass through, and reflect a second part 115 of the beam 111 having a second polarization direction. In this embodiment, the second polarization direction is perpendicular to the first polarization direction P1. The second part 115 of the beam 111 passes through the wave plate 150 and the output surface 128 to enter the light guide pipe 120 again, and at least a portion of the second part 115 of the beam 111 is then reflected by at least one of the recessed curved surface 124, the first convex surface 122, and the second convex surface 126, so as to travel back to the wave plate 150 and the polarizer 160. In this embodiment, the wave plate 150 is a quarter wave plate, and since the second part 115 of the beam 111 traveling back to the polarizer 160 passes through the wave plate 150 twice, the polarization direction of the second part 115 of the beam 111 becomes the first polarization direction P1. As a result, the second part 115 of the beam 111 with the first polarization direction P1 passes through the polarizer 160, and the second part 115 of the beam 111 is recycled, so that the light source module 100 can reduce light loss. In an embodiment the light source module 100 may recycle 30% of light.

In the light source module 100 in this embodiment, a light guide pipe 120 including a recessed curved surface 124, an output surface 128, a first convex surface 122, and a second convex surface 126 is adopted, and at least a portion of the second part 115 of the beam 111 is reflected by at least one of the recessed curved surface 124, the first convex surface 122, and the second convex surface 126, so as to travel back to the wave plate 150 and the polarizer 160. As a result, the light loss is reduced due to the light guide pipe 120 recycling light, and the volume of an optical system (e.g. the front-lit LCOS module 200) is reduced since the light guide pipe 120 is adopted and may have compact structure. Moreover, in this embodiment, the light guide pipe 120 is configured to reflect (for example, by the recessed curved surface 124) at least a portion of the second part 115 of the beam 111 to prevent it from hitting the light-emitting device 110. As a result, the portion of the second part 115 of the beam 111 will not be absorbed by the light-emitting device 110, so that the light loss is further reduced.

In an embodiment, the polarizer 160 is a wire grid polarizer film, for example. The waveguide 220 has a first surface 222, a second surface 224 opposite to the first surface 222, and a light incident surface 226 connecting the first surface 222 with the second surface 224, wherein the beam 111 from the polarizer 160 enters the waveguide 220 through the light incident surface 226. The LCOS panel 230 is disposed below the second surface 224 and configured to convert the beam 111 with the first polarization direction P1 into a polarized image beam 231 with the second polarization direction P2. The polarizer 240 is disposed on the first surface 222 and configured to allow the polarized image beam 231 with the second polarization direction P2 to pass through, wherein the polarized image beam 231 from the LCOS panel 230 passes through the second surface 224, the first surface 222, and the polarizer 240 in sequence. In this embodiment, the first polarization direction P1 is perpendicular to the second polarization direction P2.

In this embodiment, the front-lit LCOS module 200 in this embodiment further includes a plurality of micro-mirrors 250 disposed along the first surface 222 at intervals and configured to reflect the beam 111 to the LCOS panel 230. In an embodiment, each of the micro-mirrors 250 is a polarizing beam splitter film capable of reflecting the beam 111 with the first polarization direction P1 and allowing the polarized image beam 231 with the second polarization direction P2 to pass through.

In this embodiment, the recessed curved surface 124, the first convex surface 122, and the second convex surface 126 can be described by one-dimensional polynomials. However, in another embodiment, the recessed curved surface 124, the first convex surface 122, and the second convex surface 126 can be described by two-dimensional polynomials. Alternatively, the recessed curved surface 124, the first convex surface 122, and the second convex surface 126 may be described by mesh data. In this embodiment, the refractive index of the light guide pipe 120 ranges from 1.3 to 2.3. Moreover, in this embodiment, the light source module 100 further include at least one coupling lens (two coupling lenses 130 and 140 are exemplarily shown in FIG. 1) disposed between the light guide pipe 120 and the wave plate 150 to couple the beam 111 with the wave plate 150. Each of the coupling lenses 130 and 140 is a lens array, for example. However, in other embodiments, each of the coupling lenses 130 and 140 may be a single lens.

Figure 2A:
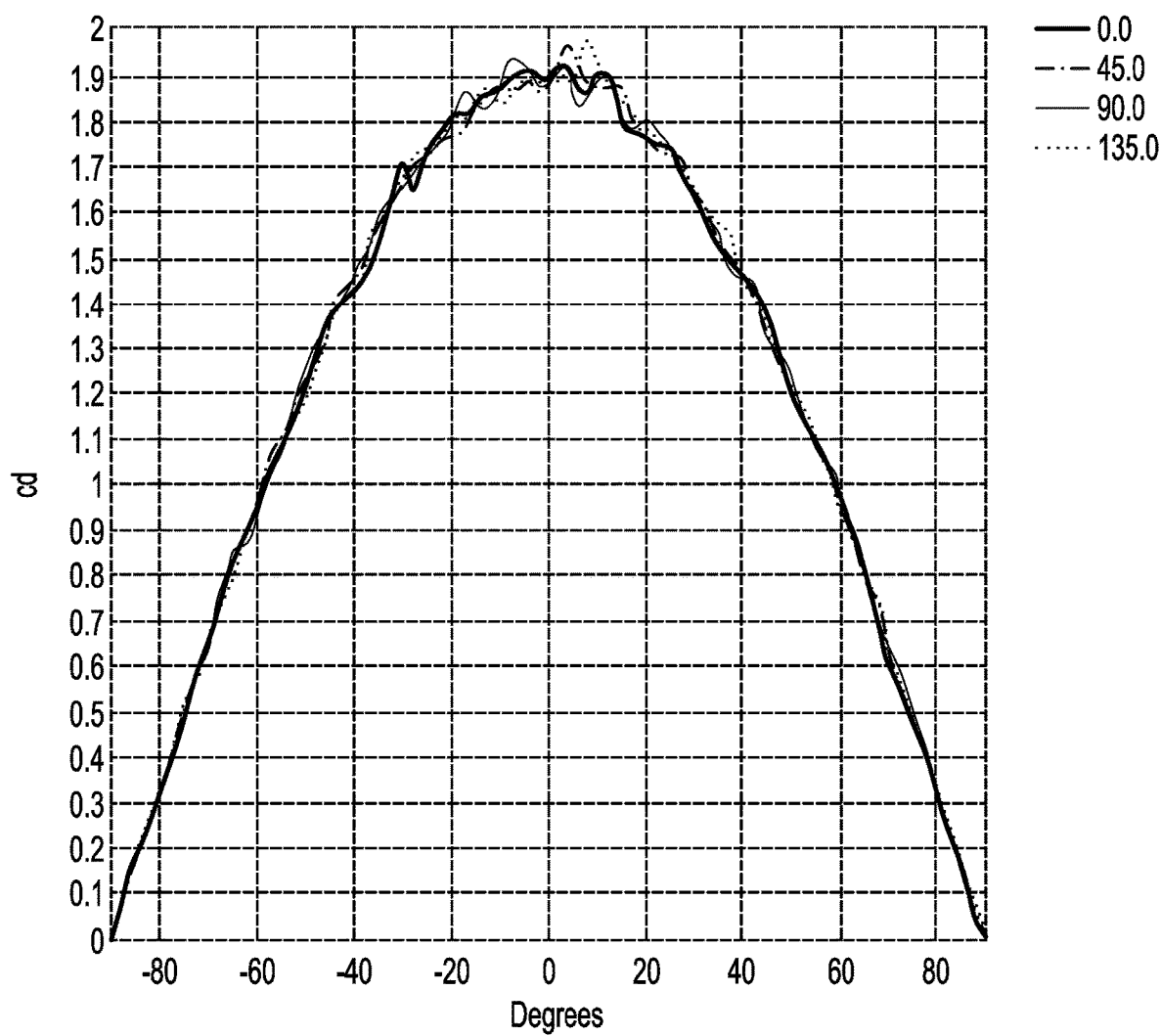
FIG. 2A is a rectangular candela distribution plot of the beam emitted by the light-emitting device before passing through the recessed curved surface in FIG. 1.
Figure 2B:
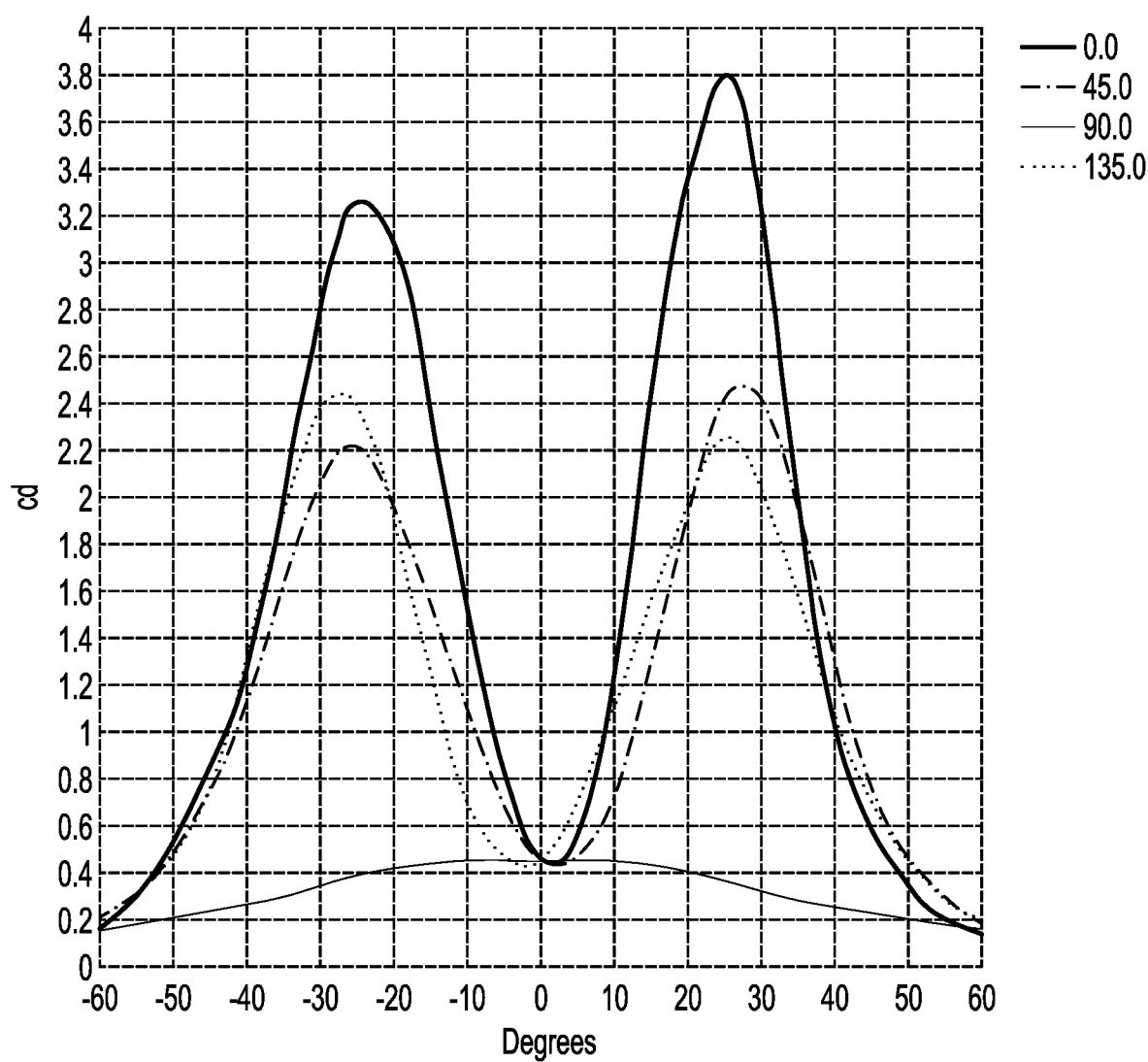
FIG. 2B is a rectangular candela distribution plot of the beam emitted by the light-emitting device after passing through the recessed curved surface in FIG. 1.

FIG. 2A is a rectangular candela distribution plot of the beam emitted by the light-emitting device before passing through the recessed curved surface in FIG. 1, and FIG. 2B is a rectangular candela distribution plot of the beam emitted by the light-emitting device after passing through the recessed curved surface in FIG. 1. In FIG. 2A and FIG. 2B, the curves denoted by 0.0, 45.0, 90.0, and 135.0 means the curves are in the planes having orientations of 0.0 degree, 45.0 degrees, 90.0 degrees, and 135.0 degrees, wherein each of the planes contains the optical axis of the light-emitting device 110, and the plane having the orientation of 0.0 degree is the figure plane of FIG. 1. It can be learned from FIG. 2A and FIG. 2B that the light guide pipe 120 is configured to convert the beam 111 emitted by the light-emitting device 110 from a Lambertian profile into a two or more intensity peaks profile (two intensity peaks are exemplarily shown in FIG. 2B).

Figure 3A:
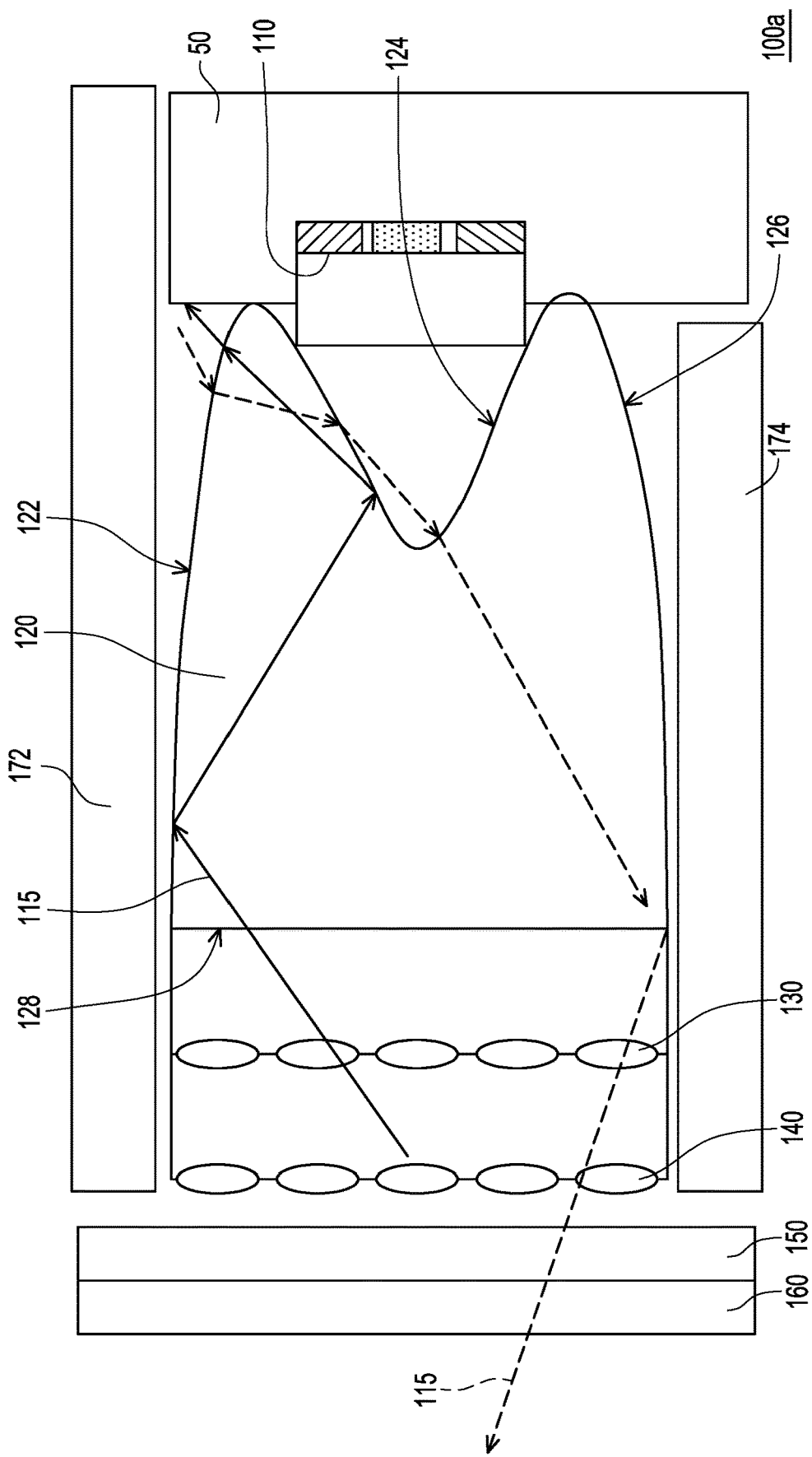
FIG. 3A and FIG. 3B are schematic cross-section views of a light source module according to another embodiment of the invention respectively showing two possible paths of the second part of the beam.
Figure 3B:
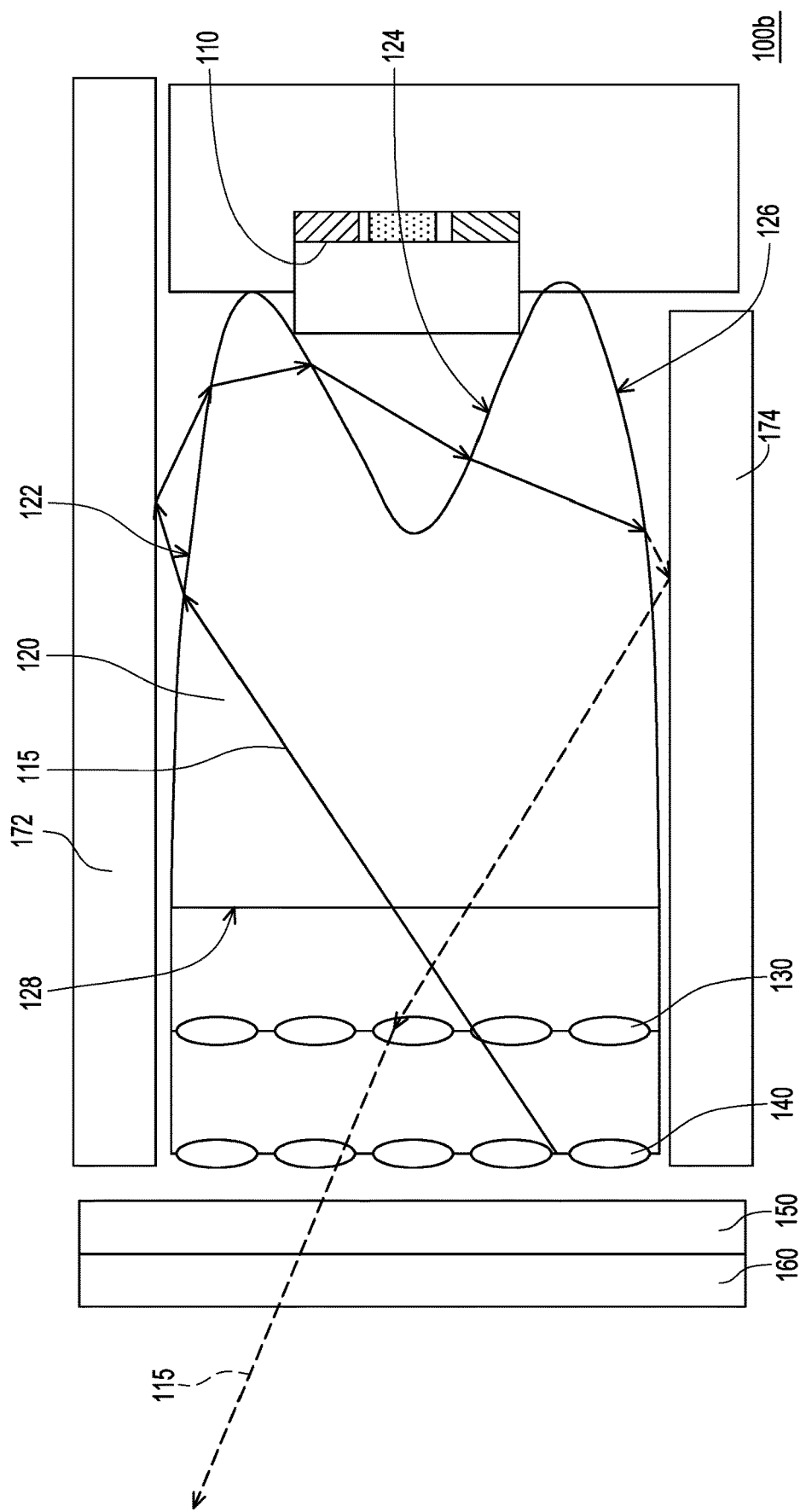

FIG. 3A and FIG. 3B are schematic cross-section views of a light source module according to another embodiment of the invention respectively showing two possible paths of the second part of the beam. Referring to FIG. 3A and FIG. 3B, the light source module 100a is similar to the light source module 100 in FIG. 1, and the main difference therebetween is as follows. In this embodiment, the light source module 100a further includes a first mirror 172 disposed to face the first convex surface 122 and a second mirror 174 disposed to face the second convex surface 126. The second part 115 of the beam 111 reflected by the polarizer 160 may have a plurality of possible recycled paths, and two paths are taken as two examples as follows and as shown in FIGS. 3A and 3B.

Referring to FIG. 3A, the second part 115 of the beam 111 reflected by the polarizer 160 is reflected by the first convex surface 122, is reflected by the recessed curved surface 124, is refracted by the first convex surface 122, is diffusively reflected by the carrier 50 carrying the light-emitting device 110, is refracted by the first convex surface 122, is refracted by the recessed curved surface 124 twice, is reflected by the second convex surface 126, and passes through the polarizer 160 in sequence. Referring to FIG. 3B, the second part 115 of the beam 111 reflected by the polarizer 160 is refracted by the first convex surface 122, is reflected by the first mirror 172, is refracted by the first convex surface 122, is refracted by the recessed curved surface 124 twice, is refracted by the second convex surface 126, is reflected by the second mirror 174, is refracted by the second convex surface 126, and passes through the polarizer 160 in sequence. In other possible recycled paths, the second part 115 of the beam 111 may be reflected or refracted by the surface of the light guide pipe 120, the first mirror 172, or the second mirror 174 many times.

Figure 4:
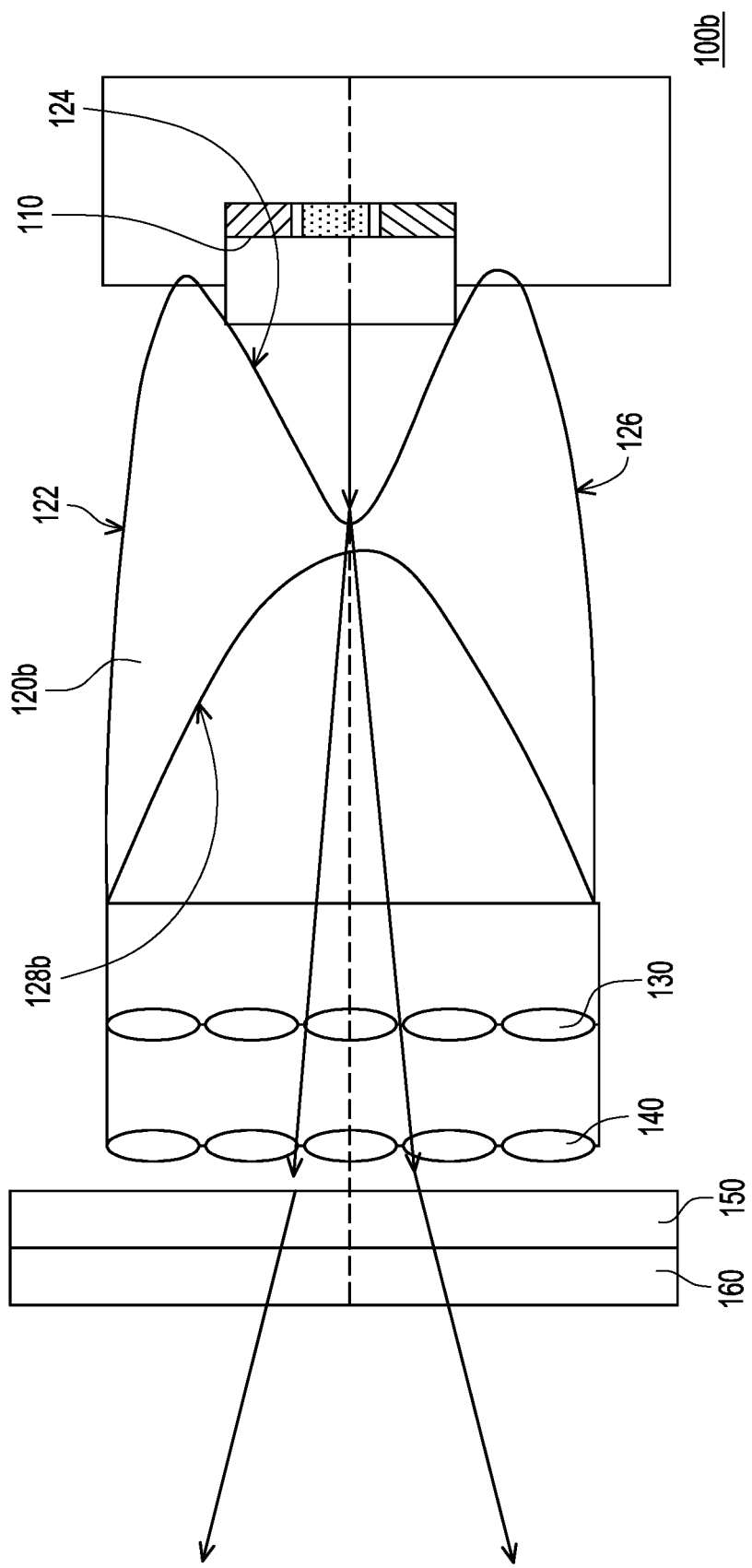
FIG. 4 is a schematic cross-section view of a light source module according to another embodiment of the invention.

FIG. 4 is a schematic cross-section view of a light source module according to another embodiment of the invention. Referring to FIG. 4, the light source module 100b in this embodiment is similar to the light source module 100 in FIG. 1, and the main difference therebetween is as follows. In the light source module 100 in this embodiment, the output surface 128b of the light guide pipe 120b is a concave surface so as to make the light guide pipe 120b be a hollow pipe.

In conclusion, in the light source module according to the embodiment of the invention, a light guide pipe including a recessed curved surface, an output surface, a first convex surface, and a second convex surface is adopted, and at least a portion of the second part of the beam is reflected by at least one of the recessed curved surface, the first convex surface, and the second convex surface, so as to travel back to the wave plate and the polarizer. As a result, the light loss is reduced due to the light guide pipe recycling light, and the volume of an optical system is reduced since the light guide pipe is adopted and may have compact structure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light source module comprising:
a light-emitting device configured to emit a beam;
a light guide pipe comprising:
 a recessed curved surface facing the light-emitting device;
 an output surface opposite to the recessed curved surface;
 a first convex surface connecting the recessed curved surface with the output surface; and
 a second convex surface connecting the recessed curved surface with the output surface and being opposite to the first convex surface, wherein the beam enters the light guide pipe through the recessed curved surface, and leaves the light guide pipe through the output surface;
a wave plate disposed on a path of the beam from the output surface; and
a polarizer disposed on a path of the beam from the wave plate and configured to allow a first part of the beam having a first polarization direction to pass through, and reflect a second part of the beam having a second polarization direction,
wherein the second part of the beam passes through the wave plate and the output surface to enter the light guide pipe again, and at least a portion of the second part of the beam is then reflected by at least one of the recessed curved surface, the first convex surface, and the second convex surface, so as to travel back to the wave plate and the polarizer.

2. The light source module according to claim 1, wherein the recessed curved surface, the first convex surface, and the second convex surface are described by one-dimensional polynomials.

3. The light source module according to claim 1, wherein the recessed curved surface, the first convex surface, and the second convex surface are described by two-dimensional polynomials.

4. The light source module according to claim 1, wherein the light guide pipe is configured to convert the beam emitted by the light-emitting device from a Lambertian profile into a two or more intensity peaks profile.

5. The light source module according to claim 1, wherein the light guide pipe is configured to reflect at least a portion of the second part of the beam to prevent it from hitting the light-emitting device.

6. The light source module according to claim 1, wherein the refractive index of the light guide pipe ranges from 1.3 to 2.3.

7. The light source module according to claim 1, wherein the output surface is a concave surface so as to make the light guide pipe be a hollow pipe.

8. The light source module according to claim 1 further comprising a first mirror disposed to face the first convex surface and a second mirror disposed to face the second convex surface.

9. The light source module according to claim 1 further comprising at least one coupling lens disposed between the light guide pipe and the wave plate.

10. The light source module according to claim 1, wherein the coupling lens is a lens array.

11. The light source module according to claim 1, wherein the wave plate is a quarter wave plate.

12. The light source module according to claim 1, wherein the light-emitting device comprises light-emitting diodes.

* * * * *